US009106552B2

(12) United States Patent
Babiarz et al.

(10) Patent No.: US 9,106,552 B2
(45) Date of Patent: Aug. 11, 2015

(54) TECHNIQUE FOR END-TO-END ADMISSION CONTROL OF REAL-TIME PACKET FLOWS

(71) Applicant: RPX Clearinghouse LLC, San Francisco, CA (US)

(72) Inventors: Jozef Babiarz, Stittsville (CA); Kwok Ho Chan, Dunstable, MA (US)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

(21) Appl. No.: 14/335,330

(22) Filed: Jul. 18, 2014

(65) Prior Publication Data

US 2014/0328174 A1    Nov. 6, 2014

Related U.S. Application Data

(63) Continuation of application No. 13/682,800, filed on Nov. 21, 2012, now Pat. No. 8,811,182, which is a continuation of application No. 10/799,704, filed on Mar. 15, 2004, now Pat. No. 8,339,963.

(60) Provisional application No. 60/497,932, filed on Aug. 27, 2003.

(51) Int. Cl.
*H04L 12/801*    (2013.01)
*H04L 12/851*    (2013.01)
(Continued)

(52) U.S. Cl.
CPC .......... *H04L 47/115* (2013.01); *H04L 12/2602* (2013.01); *H04L 12/5695* (2013.01); *H04L 29/06027* (2013.01); *H04L 43/00* (2013.01); *H04L 47/12* (2013.01); *H04L 47/15* (2013.01); *H04L 47/18* (2013.01); *H04L 47/2408* (2013.01); *H04L 47/2416* (2013.01); *H04L 47/2441* (2013.01); *H04L 47/26* (2013.01); *H04L 47/29* (2013.01); *H04L 47/31* (2013.01);
(Continued)

(58) Field of Classification Search
CPC ...... H04L 45/38; H04L 47/2441; H04L 47/26
See application file for complete search history.

(56) References Cited

U.S. PATENT DOCUMENTS 6,049,541 A * 4/2000 Kerns et al. ................... 370/365
6,385,168 B1 * 5/2002 Davis et al. ................... 370/230
(Continued)

OTHER PUBLICATIONS

Naotaka Morita, "Measurable Forwarding: A New per-Hop Behavior (PHB)" TSV working group, Internet Draft, NTT Corporation, Oct. 2003, pp. 1-19.
(Continued)

*Primary Examiner* — Raj Jain
(74) *Attorney, Agent, or Firm* — Christopher & Weisberg, P.A.

(57) ABSTRACT

A technique for end-to-end admission control of real-time packet flows is disclosed. In one embodiment, the technique may be realized as a method for end-to-end admission control of real-time packet flows in a network having a plurality of network elements. The method may include transmitting at least one probe packet from a first network element to a second network element via a network path, determining, at at least one intermediate network element on the network path, at least one flow rate associated with a plurality of packets, marking at least one predetermined bit in the at least one probe packet if the at least one flow rate is greater than a predetermined rate, and controlling an admission of additional packets into the network based at least in part on the marking of the at least one predetermined bit in the at least one probe packet.

27 Claims, 6 Drawing Sheets

(51) Int. Cl.
*H04L 12/825* (2013.01)
*H04L 12/26* (2006.01)
*H04L 12/54* (2013.01)
*H04L 29/06* (2006.01)
*H04L 12/853* (2013.01)
*H04L 12/833* (2013.01)
*H04L 12/919* (2013.01)
*H04L 12/927* (2013.01)
*H04L 12/911* (2013.01)

(52) U.S. Cl.
CPC ............ *H04L 47/765* (2013.01); *H04L 47/801* (2013.01); *H04L 47/821* (2013.01); *H04L 47/822* (2013.01); *H04L 65/1066* (2013.01); *H04L 65/80* (2013.01); *H04L 12/2692* (2013.01); *H04L 43/0876* (2013.01); *H04L 43/0888* (2013.01); *H04L 43/10* (2013.01); *H04L 43/16* (2013.01)

(56) References Cited

U.S. PATENT DOCUMENTS

| | | | | |
|---|---|---|---|---|
| 6,622,172 | B1 * | 9/2003 | Tam | 709/232 |
| 6,643,256 | B1 * | 11/2003 | Shimojo et al. | 370/229 |
| 7,142,564 | B1 * | 11/2006 | Parruck et al. | 370/474 |
| 2003/0107994 | A1 * | 6/2003 | Jacobs et al. | 370/235 |
| 2004/0192312 | A1 * | 9/2004 | Li et al. | 455/445 |
| 2007/0115814 | A1 * | 5/2007 | Gerla et al. | 370/230 |

OTHER PUBLICATIONS

Naotaka Morita, "Verification Scenarios for Measurable Forwarding PHB (Per-Hop Behavior)" TSV working group, Internet Draft, NTT Corporation, Oct. 2003, pp. 1-7.

Naotaka Morita, et al. "Framework of Priority Promotion Scheme draft-morita-tsvwg-pps-00" TSVWG, Internet Draft, NTT Corporation, Jun. 23, 2003, pp. 1-20.

Naotaka Morita, et al. "Framework of Priority Promotion Scheme" TSV working group, Internet Draft, Oct. 2003, pp. 1-18.

Shunsuke Mori, et al. "Priority Promotion Scheme (PPS)—An Autonomous and Distributed Admission Control for End-to-End Quality Service for Interactive Multimedia Services", NTT Technical Review, vol. 2(10), Oct. 2004, pp. 22-27.

Naotaka Morita, et al. "Framework of Priority Promotion Scheme (PPS) draft-morita-tsvwg-pps-00" TSVWG, Internet Draft, Jul. 18, 2003, pp. 1-20.

Tom Kelly, "An ECN Probe-Based Connection Acceptance Control" Laboratory for Communications Engineering, Jul. 2001 consisting of 12-pages.

* cited by examiner

TECHNIQUE FOR END-TO-END ADMISSION CONTROL OF REAL-TIME PACKET FLOWS

CROSS-REFERENCE TO RELATED APPLICATION

This application is a continuation of U.S. patent application Ser. No. 13/682,800, filed Nov. 21, 2012, entitled "TECHNIQUE FOR END-TO-END ADMISSION CONTROL OF REAL-TIME PACKET FLOWS", which claims priority to U.S. patent application Ser. No. 10/799,704, filed Mar. 15, 2004, entitled "TECHNIQUE FOR END-TO-END ADMISSION CONTROL OF REAL-TIME PACKET FLOWS", which claims priority to U.S. Provisional Patent Application No. 60/497,932, filed Aug. 27, 2003, the entirety of all of which are incorporated herein by reference.

FIELD

The present invention relates generally to computer and communications network and, more particularly, to a technique for end-to-end admission control of real-time packet flows.

BACKGROUND

In recent years, voice over IP (VoIP) has become a new standard for voice communications due to the ubiquity of Internet Protocol (IP) networks. Compared with traditional telephonic technology, VoIP offers the benefits of cost savings, open standards, multi-vendor interoperability, and integrated voice and data networks. Other real-time applications include, for example, video-conferencing, multimedia streaming and other multimedia services that require guaranteed quality of service (QoS), all of which may benefit from the technique for end-to-end admission control of real-time packet flows in accordance with the present invention.

Compared with traditional telephonic technology, VoIP also has its own difficulties. Traditionally voice communications have been carried over the public switched telephone network (PSTN), a circuit-switched network that can ensure the quality of each call through dedicated bandwidth allocations. This consistently high level of voice quality is called "toll quality." Unlike PSTN, IP networks are based on packet switching rather than circuit switching. Packet switching works well for data communications because it maximizes bandwidth utilization by allowing all users to dynamically share network bandwidth. However, traditional packet switching techniques do not adequately recognize the mixing of many different applications that have different traffic flow characteristics and performance requirements in one network or link. For example, real-time applications typically require minimum delay, low packet loss (or guaranteed bandwidth), whereas non-real-time application may be able to tolerate longer delays and recover from packet loss. Though telephony service, video-conferencing and one-way multimedia streaming are real-time applications, the last two are more bandwidth-demanding.

Some providers employ bandwidth management techniques such as prioritization to ensure that VoIP and other real-time multimedia applications get what they need. However, bandwidth management alone simply allocates bandwidth to critical applications at the expense of other applications and does not limit or prevent real-time applications from congesting a link to a point where the performance or quality of service offered for all real-time flows become unacceptable. Some providers or enterprises over-provision their network capacity so that application demands would never hit the bandwidth limit. This solution is not economical since it may require expensive upgrades to the carrier networks to meet the increasing peak demands for bandwidth. None of the existing solutions can prevent network congestion in an efficient and cost-effective manner and still provide high quality of service for real-time flows.

In view of the foregoing, it would be desirable to provide a solution which overcomes the above-described inadequacies and shortcomings.

SUMMARY

The According to the present invention, a technique for end-to-end admission control of real-time packet flows is provided. In one particular exemplary embodiment, the technique may be realized as a method for end-to-end admission control of real-time packet flows in a network having a plurality of network elements. The method may comprise transmitting at least one probe packet from a first network element to a second network element via a network path. The method may also comprise determining, at at least one intermediate network element on the network path, at least one flow rate associated with a plurality of packets. The method may further comprise marking at least one predetermined bit in the at least one probe packet if the at least one flow rate is greater than a predetermined rate. And the method may comprise controlling an admission of additional packets into the network based at least in part on the marking of the at least one predetermined bit in the at least one probe packet.

In accordance with other aspects of this particular exemplary embodiment of the present invention, the method may further comprise denying the admission of the additional packets into the network if the at least one predetermined bit in the at least one probe packet is marked.

In accordance with further aspects of this particular exemplary embodiment of the present invention, the method may further comprise transmitting at least one second probe packet from the second network element to the first network element via the network path, marking at least one second predetermined bit in the at least one second probe packet if the at least one flow rate is greater than a second predetermined rate, and controlling the admission of the additional packets into the network based at least in part on the marking of the at least one second predetermined bit in the at least one second probe packet. The first network element may echo information associated with the at least one second predetermined bit in the at least one second probe packet in a transmission to the network.

In accordance with additional aspects of this particular exemplary embodiment of the present invention, the admission of the additional packets may be based at least in part on priorities or importance of the plurality of packets and the additional packets. The admission of the additional packets into the network may be controlled by an entity that controls the network. Information associated with the at least one predetermined bit in the at least one probe packet may be communicated to at least one of the first network element and the second network element.

In accordance with another aspect of this particular exemplary embodiment of the present invention, the at least one intermediate network element may be part of a bandwidth-limited path in the network.

In accordance with yet another aspect of this particular exemplary embodiment of the present invention, the plurality of packets comprise real-time packets. Or the plurality of packets may comprise Internet Protocol (IP) packets, including voice over IP packets, video over IP packets and real-time multimedia over IP packets. The at least one predetermined bit may be part of a Differentiated Services field in an IP header of the at least one probe packet.

In accordance with still another aspect of this particular exemplary embodiment of the present invention, the predetermined rate may be based on a network bandwidth allocated for the plurality of packets. And the predetermined rate may be raised to a value above the allocated network bandwidth for a predetermined period of time.

In accordance with a further aspect of this particular exemplary embodiment of the present invention, the method may further comprise encoding the at least one predetermined bit in the at least one probe packet based at least in part on the at least one flow rate. And the method may further comprise discontinuing at least one packet flow based on the encoded at least one predetermined bit.

In accordance with a still further aspect of this particular exemplary embodiment of the present invention, the method may further comprise lowering a transmission rate between the first network element and the second network element or between any two network endpoints. Or the method may further comprise suspending packet transmissions without terminating the connection between the first network element and the second network element between any two network endpoints.

In another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by at least one processor readable carrier for storing a computer program of instructions configured to be readable by at least one processor for instructing the at least one processor to execute a computer process for performing the method as recited above.

In a further particular exemplary embodiment, the technique may be realized by a system for end-to-end admission control of real-time packet flows in a network. The system may comprise a first network element that transmits at least one probe packet to a second network element via a network path. The system may also comprise at least one intermediate network element on the network path that determines at least one flow rate associated with a plurality of packets, and marks at least one predetermined bit in the at least one probe packet if the at least one flow rate is greater than a predetermined rate. The system may further comprise an admission control module that controls an admission of additional packets into the network based at least in part on an examination of the at least one predetermined bit in the at least one probe packet.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION

For illustration purposes, the technique for end-to-end admission control of packet flows in accordance with the present invention will be described below with specific reference to voice over IP (VoIP) packet flows under current version of Internet Protocol (IPv4). However, it should be appreciated that the technique is applicable to any real-time packet flows such as voice, video, data and combinations thereof. The technique is also applicable to future versions of Internet Protocol including IPv6.

Figure 1:
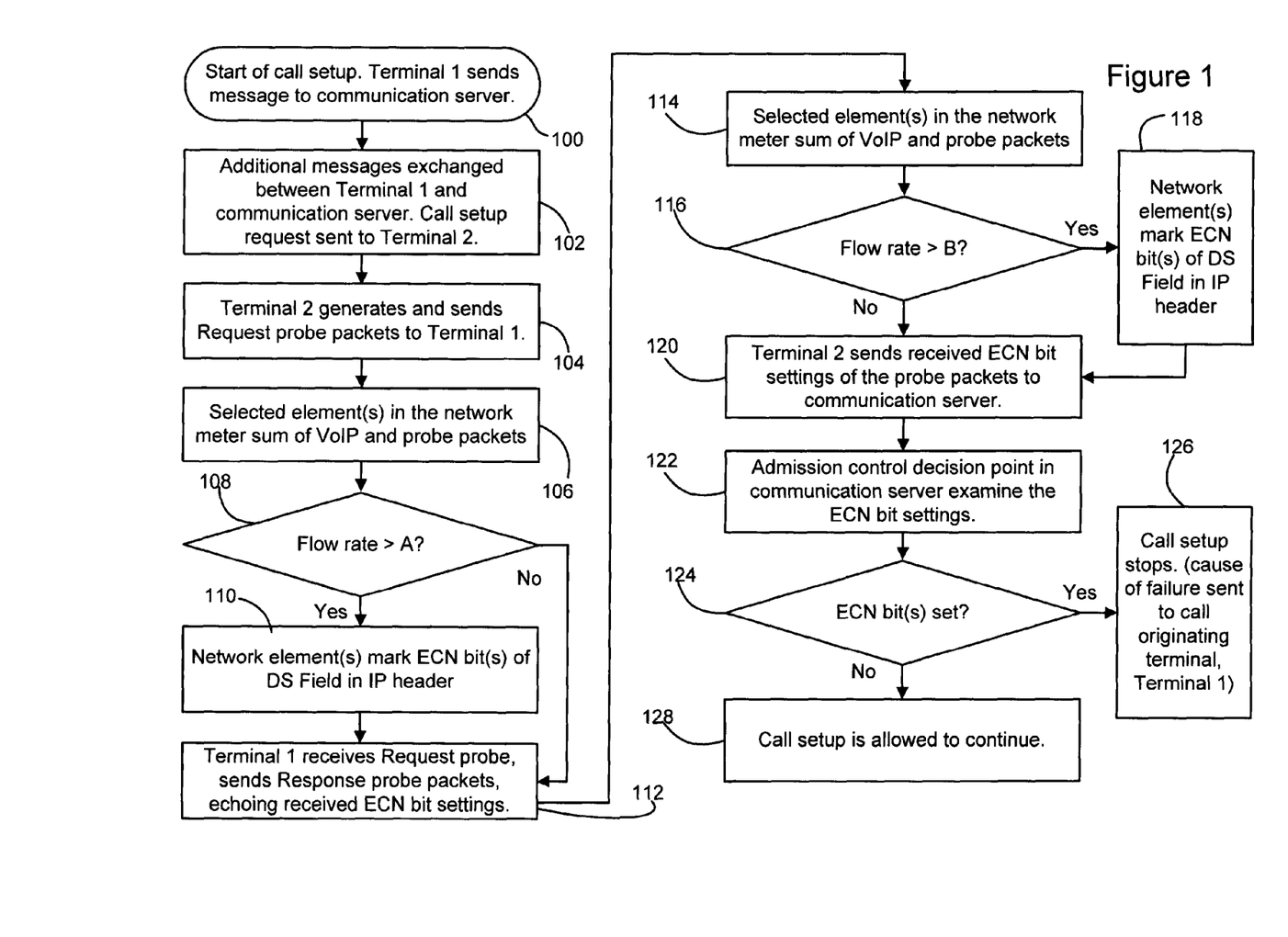
FIG. 1 is a flow chart illustrating an exemplary method for end-to-end admission control of real-time packet flows in accordance with an embodiment of the present invention.

Referring to FIG. 1, there is shown a flow chart illustrating an exemplary method for end-to-end admission control of packet flows in accordance with an embodiment of the present invention. A primary purpose of this exemplary method is to verify whether there is sufficient bandwidth along a specific network path connecting two network end terminals or VoIP clients.

In step 100, a first end terminal (Terminal 1) may initiate a call to a second end terminal (Terminal 2). The call setup may be started by using a number of standardized and/or customized signaling methods, such as Nortel Networks UniStim Interface Protocol (UNISTIM), Media Gateway Control Protocol (MGCP), Session Initiation Protocol (SIP), Automated System for Performance Evaluation of Networks (ASPEN), and the International Telecommunication Union (ITU) defined H.248 or H.323 standards can be used. For example, Terminal 1 may send message(s) to a communication server in the network. The communication server may act as a proxy between Terminal 1 and Terminal 2 to coordinate and establish a real-time connection between them.

In step 102, additional messages may be exchanged between Terminal 1 and the communication server, in which process signaling could be used to obtain authentication, authorization and IP address of Terminal 2, etc. After it is verified that call setup may continue, the call setup request may be forwarded to Terminal 2.

In step 104, upon receiving the call setup request, Terminal 2 may generate one or more probe packets (termed "REQUEST probe") and transmit them down a specific network path towards Terminal 1. The network path will be the same one that will carry VoIP payload packets once a connection is established. As used hereinafter, a "probe packet" may be a signaling packet, a control packet, or a payload packet that are sent along an end-to-end network path between two terminals or clients for the purpose of verifying bandwidth usage status. The probe packets may be of any type such as Real Time Protocol (RTP) type, ReSerVation Protocol (RSVP) type, or possibly a type currently contemplated by the Next Steps in Signaling (NSIS) Working Group, etc.

In step 106, one or more selected network elements in the network path may meter the bandwidth usage at its node. The one or more selected network elements may be routers, switches, middle-boxes or servers through which the VoIP payload packets between the two VoIP end terminals flow. According to an embodiment of the invention, the network elements may be at selected nodes located in the bandwidth-limited portions of the network path. A bandwidth-limited path may include, for example, a "critical path" or "weakest link" on the network path connecting the two VoIP end terminals. Alternatively, the bandwidth usage may be metered at any intermediate nodes or all nodes. Depending on the specific network path, one or more network elements may be selected to meter the VoIP flows. For illustration purposes, an exemplary method with only one selected network element is described hereinafter.

Figure 2:
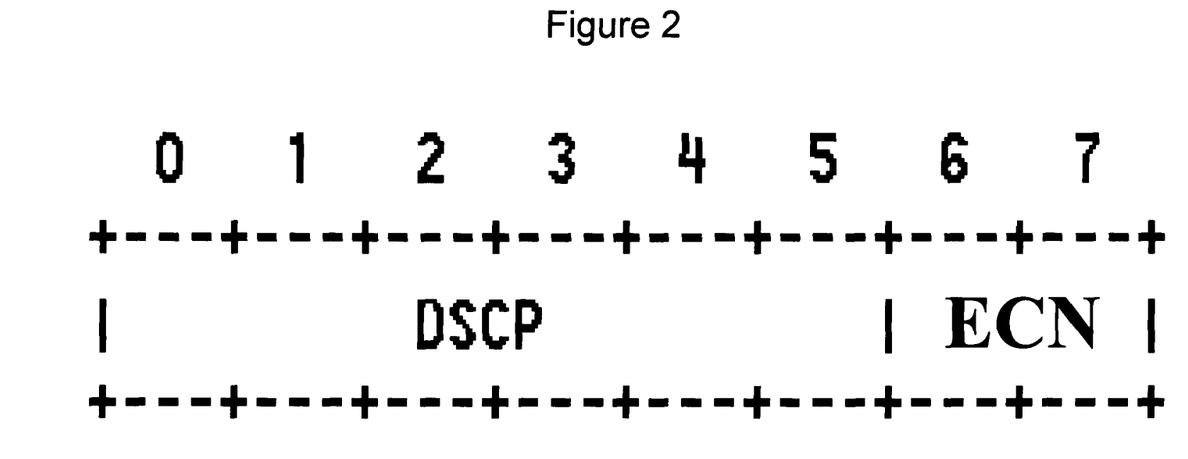
FIG. 2 is a diagram illustrating the DiffServ Field in an IPv4 packet in accordance with an embodiment of the present invention.

VoIP packet flows typically include two types of packets: signaling or control packets and payload packets. The signaling packets carry call-control messages that are used to set up and manage connections between VoIP clients. The payload packets carry the digitally encoded voice conversations. According to one embodiment of the invention, the signaling packets and payload packets may be marked with different Differentiated Services Code Point (DSCP) values. The Differentiated Services (DiffServ or DS) model defines different treatment of packet flows. FIG. 2 is a diagram illustrating the DiffServ (or DS) Field in an IPv4 packet in accordance with an embodiment of the present invention. The six most significant bits (MSBs) of the DiffServ Field is known as Differentiated Services Code Point (DSCP). The two least significant bits (LSBs) are reserved as Explicit Congestion Notification (ECN) bits. According to an embodiment of the invention, Expedited Forwarding (EF) DSCP may be used for VoIP payload and CS5 DSCP may be used for signaling, for example. According to another embodiment of the invention, the probe packets may be marked with EF DSCP.

A traffic conditioner, which is capable of metering EF or EF and CS5 packet flows and marking the ECN bit(s) of EF marked packets, may be implemented on the selected network element. For example, a sum of the VoIP and probe packets may be metered for a predetermined period of time. As a result, a flow rate may be determined as indication of the bandwidth status for packet flows having the same treatment (e.g., DSCP value being EF) at the selected network element. The flow rate may be measured on an ingress port or an egress port of the network element.

In step 108, it may be determined whether the flow rate is greater than a predetermined maximum rate "A." The maximum rate "A" may be a predetermined portion of a total bandwidth allocated for VoIP applications. For example, if a network element or network path has 10 Mbps bandwidth, 1.5 Mbps of which is allocated for VoIP service (e.g., DSCP EF and CS5 packets), the maximum rate "A" may be 1.5 Mbps. Depending on the location of the network element and/or direction of the flow, the predetermined maximum rate may be different.

If the flow rate exceeds "A," the selected network element may, in step 110, mark the ECN bit(s) of the DS Field in the IP headers in the probe packets and VoIP packets (e.g. all DSCP EF packets). According to embodiments of the invention, the ECN bit(s) may be encoded by the network element to convey a status of bandwidth usage in the VoIP path. For example, Bit 7 of the DiffServ Field may be set to indicate that the VoIP path is congested with traffic. Or both ECN bits, i.e., Bit 6 and Bit 7 of the DiffServ Field, may be encoded to indicate the level of congestion in the VoIP path, an example of which is shown in Table 1. Based on at least three predetermined flow rate thresholds, the two ECN bits may have four binary values as indications of the traffic level or congestion level. What is shown in Table 1 is only an example and other encoding configuration may also be used.

TABLE 1

Encoded ECN Bits for Different Levels of Congestion

| Traffic Load Status in the Network | Bit 6 | Bit 7 |
|---|---|---|
| Not Congested | 0 | 0 |
| $1^{st}$ Traffic Level ($1^{st}$ Level of Congestion) | 0 | 1 |
| $2^{nd}$ Traffic Level ($2^{nd}$ Level of Congestion) | 1 | 0 |
| $3^{rd}$ Traffic Level ($3^{rd}$ Level of Congestion) | 1 | 1 |

According to embodiments of the invention, the method of marking or encoding ECN bit(s) may be extended to data fields other than the ECN bits or the DS Field. Depending on the desired application and the specific signaling method, other predetermined bit(s) in the signaling packets may be marked or encoded to convey the bandwidth usage status. Nor is this method limited to signaling packets. Other types of packets, such as control packets and payload packets may also serve the same or similar purpose. For example, the predetermined bits may be in the IP header, UDP header, RTP header, or payload header of the packet that is used to convey the bandwidth usage status.

If the flow rate does not exceed "A," the network element will not mark the ECN bit(s) in the REQUEST probe packets or the VoIP payload packets, though the ECN bits may be encoded if necessary.

In step 112, upon receiving the REQUEST probe packets, Terminal 1 may generate and send one or more probe packets (termed "RESPONSE probe") back towards Terminal 2. One RESPONSE probe packet may be generated for each REQUEST probe packet received. Terminal 1 echoes the ECN bit settings in the REQUEST probe packets. That is, Terminal 1 may copy these settings in the RESPONSE probe packets.

In step 114, the one or more selected elements in the network path may again meter the bandwidth usage at their nodes. The flow rate of the sum of VoIP and probe packets may be metered.

In step 116, it may be determined whether the flow rate is greater than a predetermined maximum rate "B." Depending on the location of the network element and/or direction of the flow, the predetermined maximum rate may be different. For example, the maximum rate on access links may be different from that on internal nodes. If the flow rate exceeds "B," the selected network element may, in step 118, mark or encode the ECN bit(s) of the DS Field in the IP headers of the RESPONSE probe packets and VoIP payload packets.

In step 120, upon receiving the RESPONSE probe packets, Terminal 2 may echo or relay the ECN bit settings received into one or more messages it subsequently sends to the communication server.

In step 122, an admission control decision point in the communication server may examine the ECN bit settings carried in the one or more messages sent by Terminal 2.

If it is determined, in step 124, that the ECN bits are set (i.e., marked or encoded), the communication server may, in step 126, stop the call setup process between Terminal 1 and Terminal 2. In addition, the cause of failure may be sent to Terminal 1, the call originating terminal. Emergency calls, when present, may be admitted even if they exceed flow rate "A." In that case, bandwidth may be temporarily borrowed from other applications to serve the emergency calls. In response to a shortage of assigned bandwidth, other actions that may also be taken. For example, based on the bandwidth usage status conveyed by ECN bits, the transmission rate between Terminal 1 and Terminal 2 (or between any two terminals) may be lowered to some extent (e.g., voice codec may be changed from G.711 to G.729, video encoding may be changed from 1.5 Mbps to 768 Kbps, etc.) If necessary, some transmissions may even be suspended without completely terminating the connections. Or, if necessary, some established connections may be torn down.

If the ECN bits are not set, which indicates there is no congestion along the specific network path, then in step 128, call setup may be allowed to continue and a VoIP connection may be established between Terminal 1 and Terminal 2.

Figure 4:
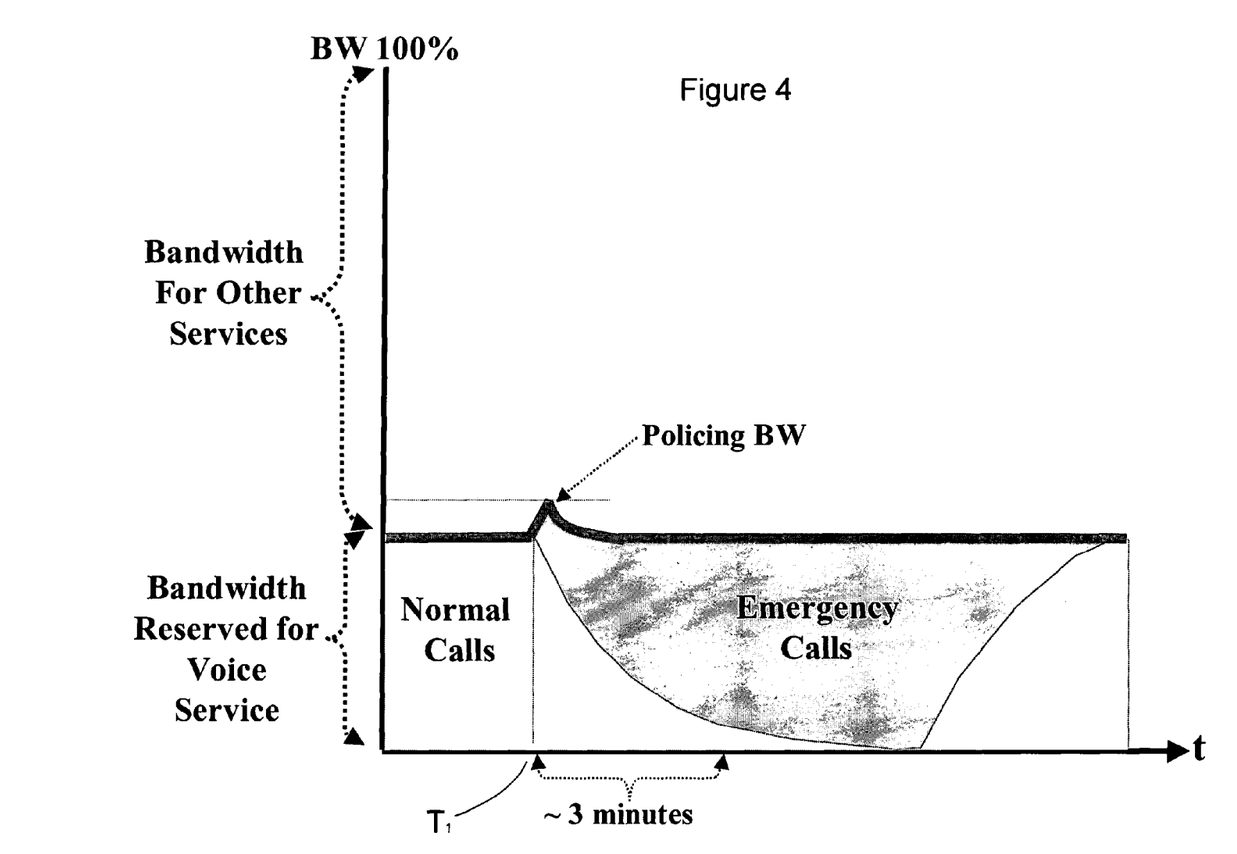
FIG. 4 is an exemplary bandwidth diagram in accordance with an embodiment of the present invention.

According to embodiments of the invention, new emergency calls may still be allowed even when normal calls are denied access to the network. In fact, a network implementing the method for end-to-end admission control of packet flows may over-subscribe VoIP calls for a certain period of time without negative impact to an overall performance of the network. An exemplary bandwidth diagram illustrating temporary over-subscription is shown in FIG. 4. In this exemplary diagram, a total bandwidth of the network is divided into two parts. One part is allocated for voice services such as VoIP and video-telephony. The rest of the bandwidth is allocated for other services or applications. In practice, a combination of normal calls and emergency calls may be allowed to use more bandwidth than what is allocated for voice services, up to a policing bandwidth. For example, up till time $T_1$ the network may have been servicing normal calls using all the voice services bandwidth. Then, a number of emergency calls may request setup. Instead of dropping ongoing normal calls to make space for emergency calls, the network may stop admitting additional normal calls and borrow a portion of the bandwidth from other applications to service the incoming emergency calls. Within approximately three minutes, which is the average length of normal calls, a number of voice calls will terminate normally, freeing up significant portion of bandwidth in the voice service or forwarding class. After then, emergency calls may be allowed to take up most or all of the bandwidth allocated to voice service.

According to embodiments of the invention, a number of implementations are possible for the end terminals to send probe packets to verify end-to-end bandwidth availability. For example, the call originating end may send REQUEST probe first to call terminating end, and the call terminating end may then send a RESPONSE probe back to the call originating end or vise versa. Or, instead of one terminal sending probe packets after the other terminal, both terminals can send probe packets towards each other at the same time.

Figure 5:
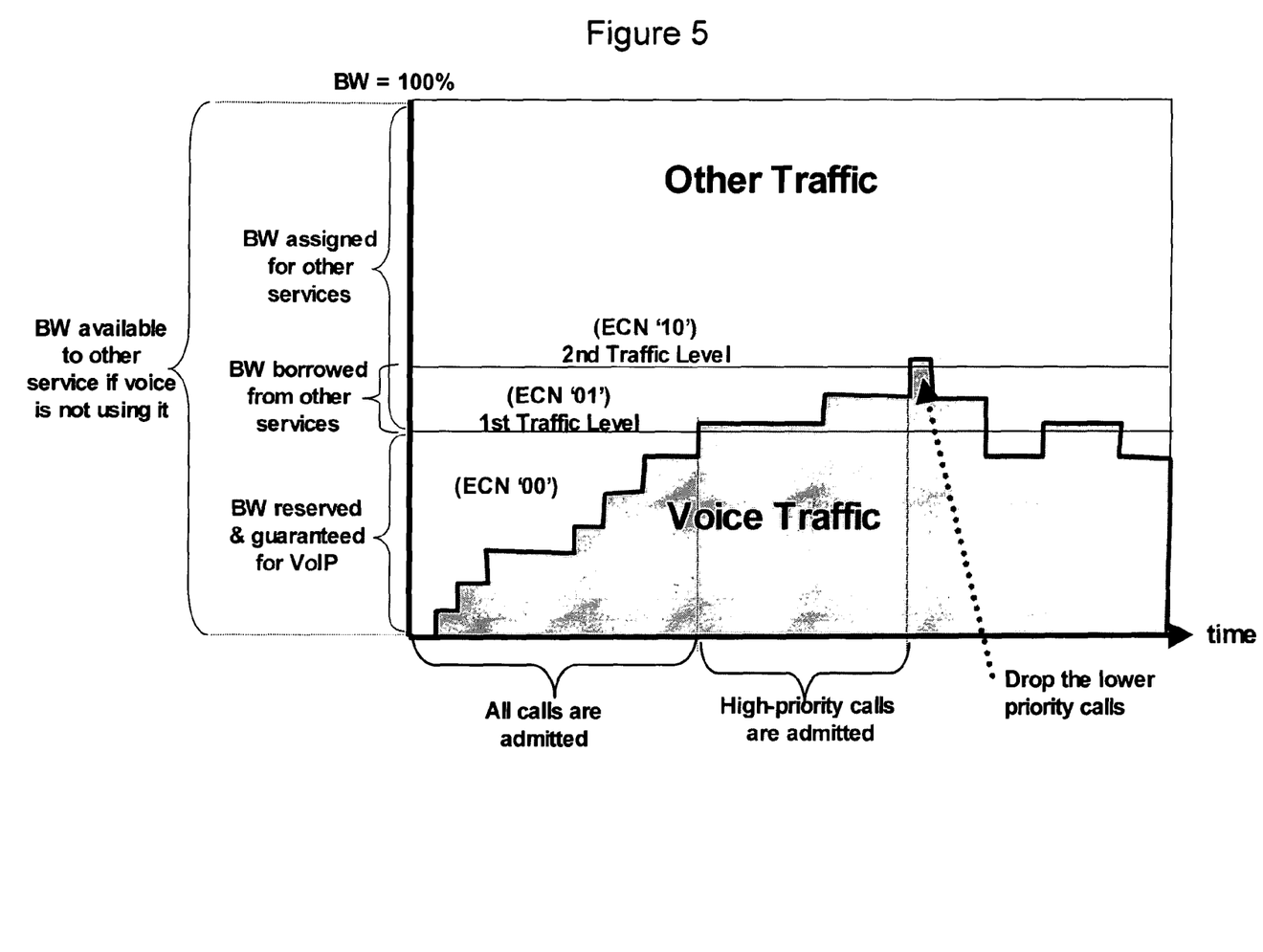
FIG. 5 is another exemplary bandwidth diagram in accordance with an embodiment of the present invention.

FIG. 5 is another exemplary bandwidth diagram in accordance with an embodiment of the present invention. In this exemplary diagram, a total bandwidth of the network is also divided into two parts. One part is reserved and guaranteed for VoIP services. The other part is allocated for other services or applications, part of which can be borrowed for VoIP oversubscription. If VoIP service is under-subscribed, its free bandwidth may be dynamically allocated for other services. When the total voice traffic is below a first traffic level (ECN encoded as "00"), all VoIP calls may be admitted. When the total voice traffic exceeds the first traffic level but is below a second traffic level (ECN encoded as "01"), only VoIP calls above a certain priority level may be admitted and they take up a portion of bandwidth borrowed from other services. The higher priority calls are typically emergency calls or may be higher priority or importance calls as declared by the service being offered. Lower priority calls are denied access to the network. Once the voice traffic exceeds the second traffic level (ECN encoded as "10"), "preemptive termination" of calls will take effect. That is, connections for ongoing VoIP calls may be dropped starting from those having the lowest priority.

Figure 3:
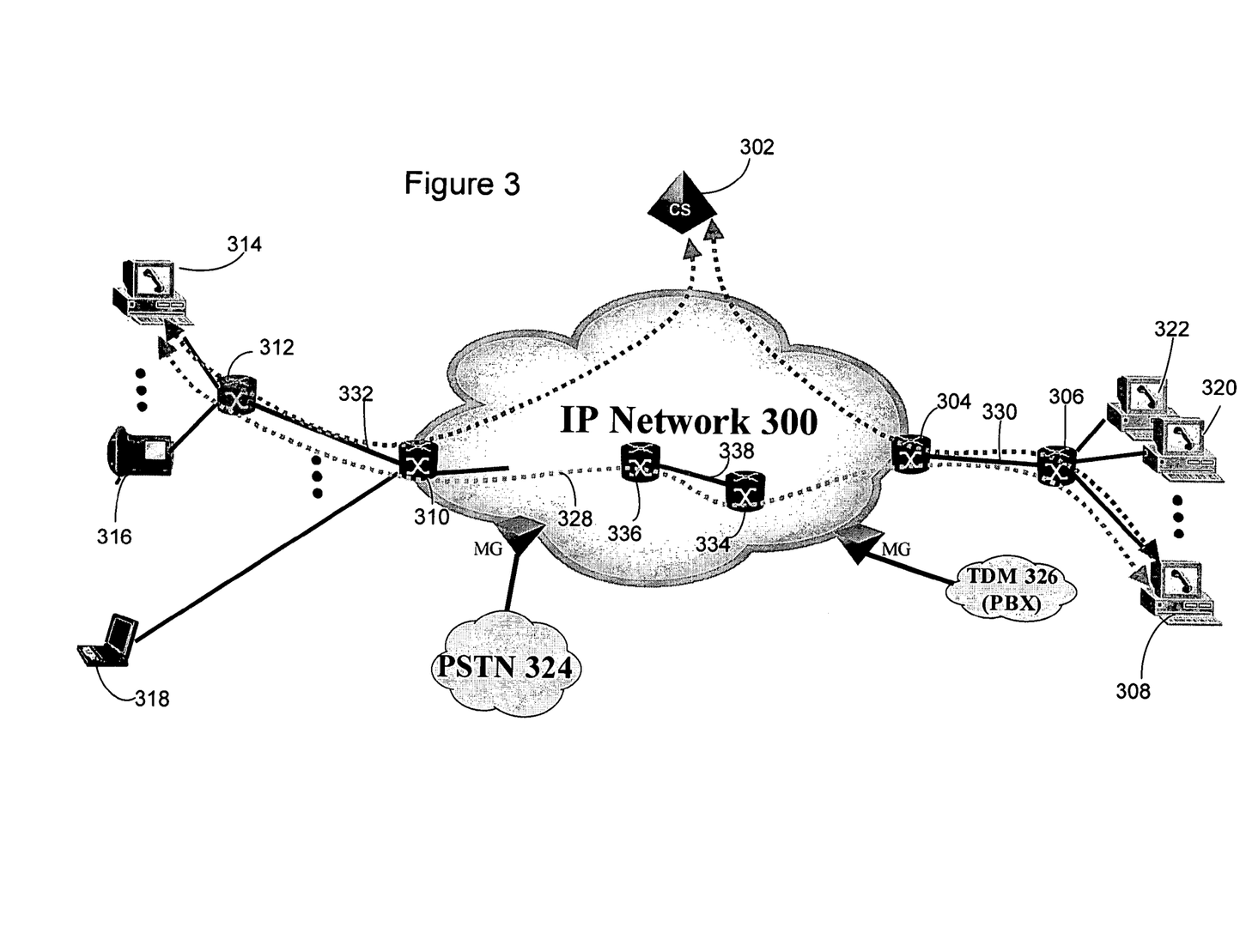
FIG. 3 is a block diagram illustrating an exemplary system for end-to-end admission control of real-time packet flows in accordance with an embodiment of the present invention.

FIG. 3 is a block diagram illustrating an exemplary system for end-to-end admission control of packet flows in accordance with an embodiment of the present invention. The system may comprise a plurality of network elements (e.g., Router 304, Router 306, Router 310 and Router 312) located on or near the edge of an IP Network 300. The system may also comprise a plurality of network elements (e.g., Router 334 and Router 336) located on a "critical path" (e.g., connection 338) between two VoIP clients. The system may further comprise a Communication Server 302 serving as an admission control decision point in this particular embodiment. Routers 304, 306, 310, 312, 334 and 336 serve as part of a connection path 328 between VoIP clients 308 and 314. There are also other VoIP clients or end terminals (316, 318, 320 and 322) that are served by these routers. IP Network 300 may be also connected to a public switched telephone network (PSTN) 324 and a Time-Division Multiplexing (TDM) PBX (Private Branch Exchange) network 326 through their respective media gateways. A connection 330 between Routers 304 and 306 serves as an access link for VoIP clients 308, 320 and 322. A connection 332 between Routers 310 and 312 serves as an access link for VoIP clients 314 and 316.

In order to initiate a call to VoIP client 308, VoIP client 314 may send signaling packets through access link 332 to Communication Server 302. Communication Server 302 may process the call setup signaling request messages and send a call setup request message to VoIP client 308. Upon receiving call setup request, VoIP client 308 may be triggered to send one or more REQUEST probe packets towards VoIP client 314. As the REQUEST probe packets travel through the network, bandwidth usage along the path is measured and ECN bits may be set if measured bandwidth usage exceeds Rate "A." Bandwidth usage status may be measured in upwards direction on access link 330 by either Router 304 or 306 or both, then on a critical path 338 towards the direction of IP client 314, either by Router 334 or Router 336 or both, and in the downward direction on access link 332 by either Router 310 or 312 or both. When the REQUEST probe packets sent by VoIP client 308 reach VoIP client 314, VoIP client 314 may copy the ECN bit settings in these probe packets into its outgoing RESPONSE probe packets that are generated and sent back towards IP client 308. As the RESPONSE probe packets travel through the network, bandwidth usage along the reverse path may be measured and ECN bits may be set if measured bandwidth usage exceeds Rate "B." Bandwidth usage status may be measured in upwards direction on access link 332 by either Router 312 or 310 or both, then on critical path 338 towards the direction of IP client 308, either by Router 334 or Router 336 or both, and in the downward direction on access link 330 by either Router 304 or 306 or both. Upon receiving RESPONSE probe packet, IP client 308 generates and sends a message that conveys the ECN bits setting as measured by the probe packets in both directions to Communication Server 302. Communication Server 302 may examine the ECN bits status received. If the ECN bits are marked, Communication Server 302 may become notified of a network congestion level for the new call being setup in both direction end-to-end. As a result, Communication Server 302 may discontinue call setup between the VoIP clients 314 and 308, and send call-failure cause to VoIP client 314 or both.

For a better understanding of the different scenarios, one specific example for end-to-end admission control is described below in connection with FIG. 6.

Figure 6:
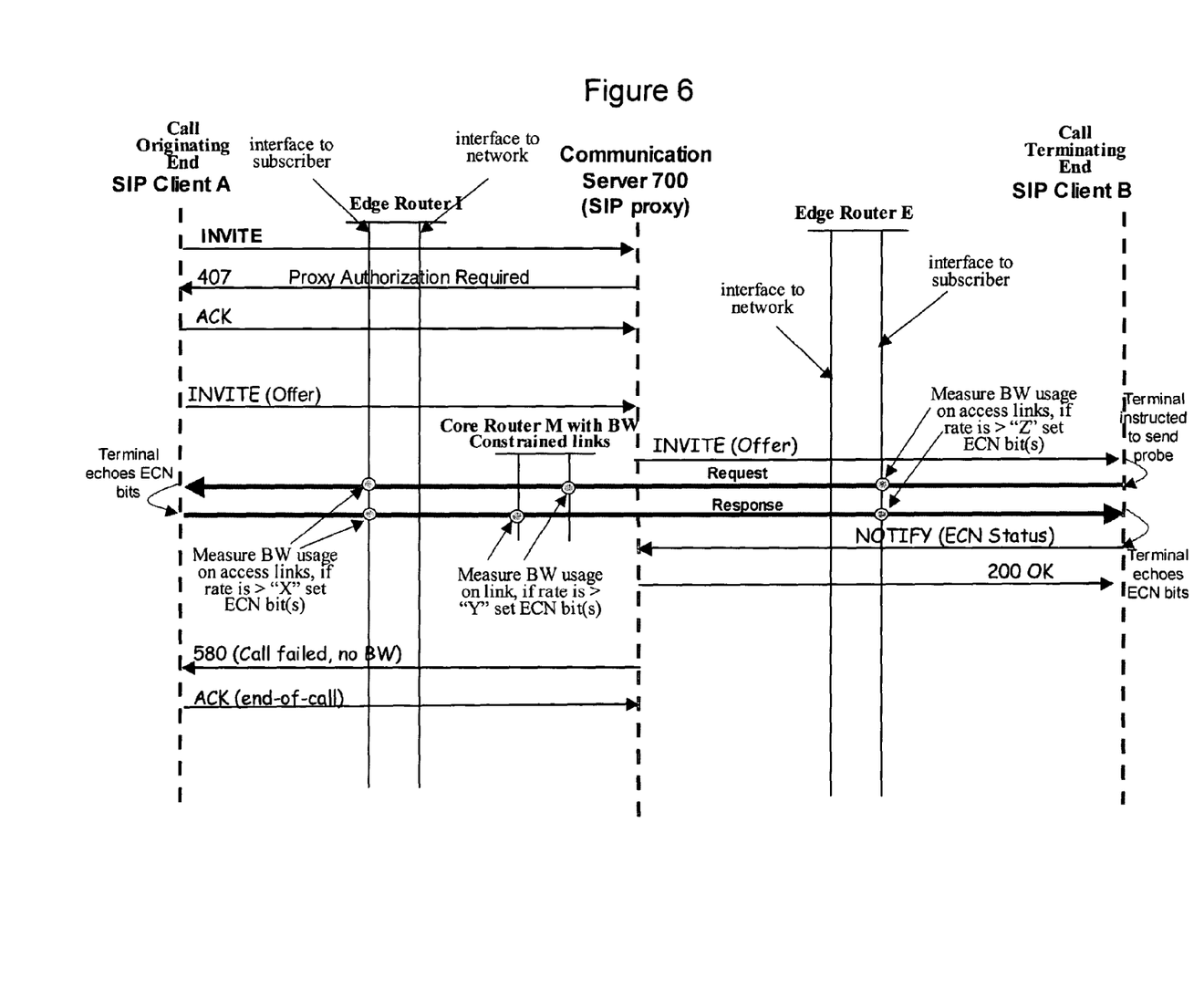
FIG. 6 is a schematic illustration of an admission control scenario in accordance with an embodiment of the present invention.

In FIG. 6, there is schematically shown a SIP Client A at the call-originating end, an Edge Router I, a Communication Server 700, an Edge Router E and a SIP Client B at the call-terminating end. There is also shown a plurality of packet streams. After exchanging initial call setup messages with Communication Server 700, Client A may send an INVITE (Offer) message to Client B. Client B may then generate and send a REQUEST probe (e.g., RTP type packets) towards Client A. Client A may send a RESPONSE probe echoing the ECN bit settings in the REQUEST probe. Packets of both probes will flow along a specific network path which include edge routers (e.g., Edge Routers I and E) and core routers (e.g., Core Router M). One or more of the routers may be selected to monitor the bandwidth usage and mark the ECN bits in the probe packets accordingly. The maximum allowed flow rates at the different routers may be same or different. Once it receives the RESPONSE probe, Client B may copy the ECN bit settings from the probe packets into a NOTIFY message or any other messages that are sent to the Server 700. Server 700 may examine the ECN bit settings carried in the NOTIFY message to determine the end-to-end bandwidth usage status in both directions. If the ECN bits have been marked, Server 700 may stop the call setup and send a 580 "Service Unavailable" message to Client A, the call originating terminal. Client A may acknowledge the end of call with an ACK message. If the ECN bits have not been marked, Server 700 may send a 200 "OK" message to Client B and the VoIP call setup will continue.

At this point it should be noted that the technique for end-to-end admission control of packet flows in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with end-to-end admission control of packet flows in accordance with the present invention as described above. Alternatively, one or more processors operating in accordance with stored instructions may implement the functions associated with end-to-end admission control of packet flows in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A network node for a packet-based communication network, the network node comprising:
    at least one communication interface for coupling the network node to the communication network;
    a traffic conditioner coupled to the at least one communication interface, the traffic conditioner being configured to:
        receive at least one probe packet on a network path which includes the network node;
        determine at least one flow rate associated with a plurality of packets;
        compare the at least one flow rate to at least one predetermined threshold;
        set an explicit congestion notification (ECN) in the at least one probe packet based on the comparison of the at least one flow rate to the at least one predetermined threshold; and
        forward the at least one probe packet on the network path.

2. The network node of claim 1, wherein the traffic conditioner is configured to forward the at least one probe packet on the network path by forwarding the at least one probe packet along the network path toward an end system terminating the network path to enable the end system to report the ECN to the network controller.

3. The network node of claim 1, wherein the traffic conditioner is further configured:
    to receive at least one second probe packet on the network path, the second probe packet echoing the ECN set in the at least one probe packet;
    to determine at least one flow rate associated with a plurality of packets;
    to compare the at least one flow rate to at least one predetermined threshold;
    to set an ECN in the at least one second probe packet based on a combination of the comparison of the at least one flow rate to the at least one predetermined threshold and the ECN set in the received at least one second probe packet; and
    to forward the at least one second probe packet on the network path.

4. The network node of claim 3, wherein the traffic conditioner is configured to forward the at least one second probe packet on the network path by forwarding the at least one second probe packet along the network path toward an end system terminating the network path to enable the end system to report the ECN to a network controller.

5. The network node of claim 1, wherein the network node is an intermediate node on a bandwidth-limited path in the network.

6. The network node of claim 1, wherein the ECN is represented as part of a differentiated services field in a header of the at least one probe packet.

7. The network node of claim 1, wherein the predetermined threshold is based on a network bandwidth allocated for the plurality of packets.

8. The network node of claim 7, wherein the traffic conditioner is configured to raise the predetermined threshold to a value above the allocated network bandwidth for a predetermined period of time.

9. The network node of claim 1, wherein the traffic conditioner is configured to set the ECN in the at least one probe packet by encoding at least two predetermined bits in the at least one probe packet to encode results of comparisons of the flow rate with multiple predetermined thresholds.

10. The network node of claim 1, wherein the plurality of packets comprise real-time packets.

11. The network node of claim 1, wherein the plurality of packets comprise Internet Protocol (IP) packets.

12. The network node of claim 11, wherein the plurality of packets comprise at least one of voice over IP packets, video over IP packets and real-time multimedia over IP packets.

13. The network node of claim 1, wherein the traffic conditioner is configured to determine at least one flow rate associated with a plurality of packets by metering packets associated with at least one packet flow for a predetermined period of time.

14. A network controller for controlling admission of packet flows in a communication network having a plurality of network nodes, the network controller comprising:
- at least one communication interface for coupling the network node to the communication network;
- at least one processor coupled to the at least one communication interface; and
- at least one processor-readable medium storing instructions for execution by the processor to support admission control of packet flows in the communication network, the instructions comprising:
  - instructions executable to receive explicit congestion notification (ECN) information based at least in part on a comparison of at least one flow rate to at least one predetermined threshold at at least one network node, the at least one flow rate being associated with a plurality of packets; and
  - instructions executable to control admission of packet flows into the network based at least in part on the received ECN information.

15. The network controller of claim 14, wherein the instructions executable to receive ECN information comprise instructions executable to receive the ECN information via an end station terminating a network path, the at least one network node being on the network path.

16. The network controller of claim 14, wherein the instructions executable to receive ECN information comprise instructions executable to receive ECN information based on comparisons of at least two flow rates to at least one predetermined threshold, the two flow rates being in opposite directions on a network path.

17. The network controller of claim 14, wherein the at least one network node comprises at least one intermediate node on a bandwidth-limited path in the network.

18. The network controller of claim 14, wherein the ECN is part of a differentiated services field in a header of the at least one probe packet.

19. The network controller of claim 14, wherein the predetermined threshold is based on a network bandwidth allocated for the plurality of packets.

20. The network controller of claim 19, wherein the instructions comprise instructions executable to raise the predetermined threshold to a value above the allocated network bandwidth for a predetermined period of time.

21. The network controller of claim 14, wherein the ECN information is encoded in at least two predetermined bits to encode results of comparisons of the flow rate with multiple predetermined thresholds.

22. The network controller of claim 14, wherein the instructions executable to control admission of additional packet flows into the network comprise instructions executable to discontinue at least one packet flow based on the ECN.

23. The network controller of claim 14, wherein the instructions executable to control admission of additional packets into the network comprise instructions executable to modify a transmission rate between any two network endpoints based on the ECN information.

24. The network controller of claim 14, wherein the instructions executable to control admission of additional packets into the network comprise instructions executable to suspend packet transmissions without terminating a connection between any two endpoints based on the ECN information.

25. The network controller of claim 14, wherein the plurality of packets comprise real-time packets.

26. The network controller of claim 14, wherein the plurality of packets comprise Internet Protocol (IP) packets.

27. The network controller of claim 26, wherein the plurality of packets comprise at least one of voice over IP packets, video over IP packets and real-time multimedia over IP packets.

* * * * *